(12) United States Patent
Lin et al.

(10) Patent No.: US 8,139,346 B2
(45) Date of Patent: Mar. 20, 2012

(54) ELECTRONIC APPARATUS AND INPUT DEVICE THEREOF

(75) Inventors: Mei Jui Lin, Taipei (TW); Shen Yuan Lee, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 313 days.

(21) Appl. No.: 12/617,147

(22) Filed: Nov. 12, 2009

(65) Prior Publication Data
US 2010/0118499 A1    May 13, 2010

(30) Foreign Application Priority Data

Nov. 13, 2008  (TW) .............................. 97143864 A

(51) Int. Cl.
*H05K 7/14* (2006.01)
(52) U.S. Cl. ..................... 361/679.18; 361/809; 361/807
(58) Field of Classification Search .......... 361/807–809, 361/814, 679.1, 679.18, 679.3
See application file for complete search history.

(56) References Cited

U.S. PATENT DOCUMENTS

| | | | | |
|---|---|---|---|---|
| 5,150,118 A | * | 9/1992 | Finkle et al. .................... | 341/23 |
| 5,865,546 A | * | 2/1999 | Ganthier et al. ............. | 400/489 |
| 6,541,762 B2 | * | 4/2003 | Kang et al. .................... | 250/239 |
| 6,965,076 B2 | * | 11/2005 | Wu ................................ | 174/541 |
| 6,977,811 B1 | * | 12/2005 | Fleck et al. .............. | 361/679.18 |
| 7,057,603 B2 | * | 6/2006 | Hill et al. ...................... | 345/161 |
| 2009/0179869 A1 | * | 7/2009 | Slotznick ...................... | 345/173 |

FOREIGN PATENT DOCUMENTS

| | | |
|---|---|---|
| CN | 2383142 Y | 6/2000 |
| CN | 2514578 | 10/2002 |
| CN | 1949141 A | 4/2007 |
| CN | 2887006 | 4/2007 |
| CN | 2891595 | 4/2007 |
| CN | 200976134 Y | 11/2007 |
| CN | 201060773 | 5/2008 |

\* cited by examiner

*Primary Examiner* — Dameon Levi
(74) *Attorney, Agent, or Firm* — Morris Manning & Martin LLP; Tim Tingkang Xia, Esq.

(57) ABSTRACT

The invention discloses an electronic apparatus comprising a casing with an input device. The input device comprises a circuit board, a first input module, a fixing module and a second input module. The first input module is disposed on the circuit board and comprises a first fixing portion. The fixing module comprises a first opening, a first accommodating space and a plurality of second fixing portions. The fixing module is disposed on the circuit board. The first input module is disposed in the first accommodating space and protrudes from the first opening. Those second fixing portions are against the first fixing portion to fix the first input module. The second input module is disposed on the fixing module and comprises a second opening. The first input module is exposed from the second opening. Furthermore, the fixing module comprises a second accommodating space for accommodating electronic components on the circuit board.

14 Claims, 7 Drawing Sheets

ELECTRONIC APPARATUS AND INPUT DEVICE THEREOF

BACKGROUND OF THE INVENTION

1. Field of the Invention

The invention relates to an electronic apparatus, and more particularly, to an electronic apparatus having an input module.

2. Description of the Related Art

With the advances in technology, a variety of electronic apparatuses that feature light weight, multi-functions, and high power saving capacity (e.g., a mobile phone, a PDA, a digital camera, an electronic dictionary, etc.) have been developed. Generally, many keyswitches are disposed on the electronic apparatus and are pressed by users for executing or selecting functions. However, the traditional single keyswitch is not sufficient under the condition that the predetermined functions are gradually increased. Therefore, a large number of electronic apparatuses install different kinds of input modules, such as an input apparatus which combines a keyboard and an optical mouse.

If willing to achieve an input apparatus which possess a keyboard and an optical mouse simultaneously, a traditional way is to position and fix the optical mouse on a circuit board with the structure of the keyboard. After the keyboard and the optical mouse are disposed on the circuit board, there is no space for other electronic components to be disposed. In other words, the layout area on the circuit broad may be limited. To dispose necessary electronic components on the circuit board, the size of the circuit board needs to be increased, and then the size of the electronic apparatus is also increased.

SUMMARY OF THE INVENTION

A scope of the invention is to provide an electronic apparatus which can effectively fix the input module and increase the layout area on the circuit board.

According to an embodiment, the input apparatus of the invention includes a circuit board, a first input module, a fixing module, and a second input module. The first input module is disposed on the circuit board and includes a first fixing portion. The fixing module includes a first opening, a first accommodating space, and a plurality of second fixing portions. The fixing module is disposed on the circuit board. The first input module is disposed in the first accommodating space and extends out of the first opening. The second fixing portions are disposed around the first opening and against the first fixing portion for fixing the first input module. The second input module is disposed on the fixing module and includes a second opening. The first input module is exposed from the second opening of the second input module.

In the embodiment, the first input module can be an optical mouse, and the second input module can be a keyboard module. Additionally, the fixing module further includes a second accommodating space, so that a plurality of electronic components can be disposed on the circuit board and located in the second accommodating space.

Another scope of the invention is to provide an electronic apparatus. The electronic apparatus includes a housing and an input device which is disposed on the housing. The input device effectively fixes the input module and increases the layout area on the circuit board. The main components and the configurations of the input apparatus are described in detail above.

Accordingly, the invention positions and fixes the input module (e.g., an optical mouse) by using a fixing module and disposes an accommodating space which can accommodate electronic components in the fixing module to greatly increase the layout area on the circuit board. Thereby, the electronic apparatus can be minimized to make it attractive to consumers.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
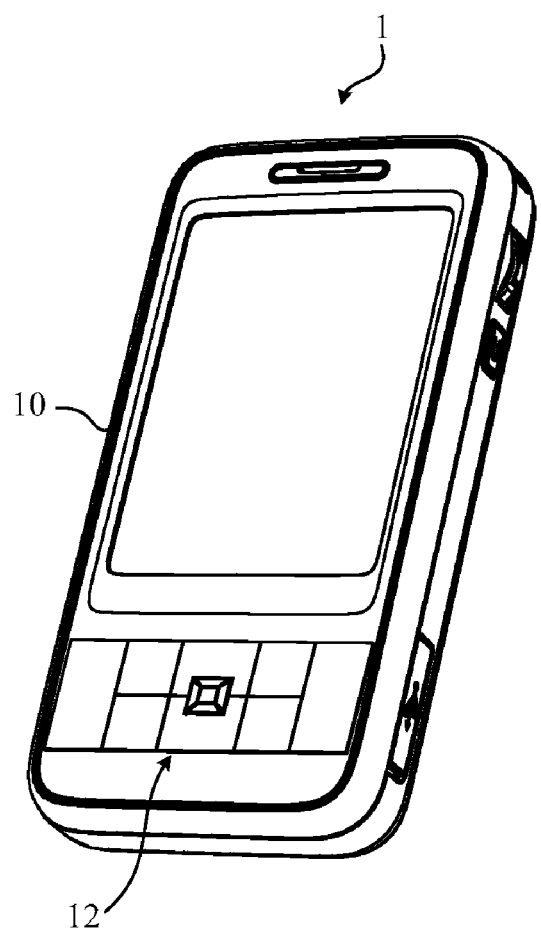
FIG. 1 is a schematic diagram illustrating an electronic apparatus according to an embodiment of the invention.

Please refer to FIG. 1. FIG. 1 is a schematic diagram illustrating an electronic apparatus 1 according to an embodiment of the invention. The example of the electronic apparatus 1 illustrated in FIG. 1 is, but not limited to, a mobile phone. In practical application, the electronic apparatus 1 can also be a PDA, a digital camera, an electronic dictionary, etc.

As shown in FIG. 1, the electronic apparatus 1 includes a housing 10 and an input device 12. The input device 12 is disposed on the housing 10. Generally, lots of software and hardware which are necessary during operation are disposed in the housing 10 of the electronic apparatus 1, such as a CPU, a RAM (Random Access Memory), a ROM (Read Only Memory), a display panel, a backlight module, a battery for providing power, an OS (Operation System), etc.

Figure 2:
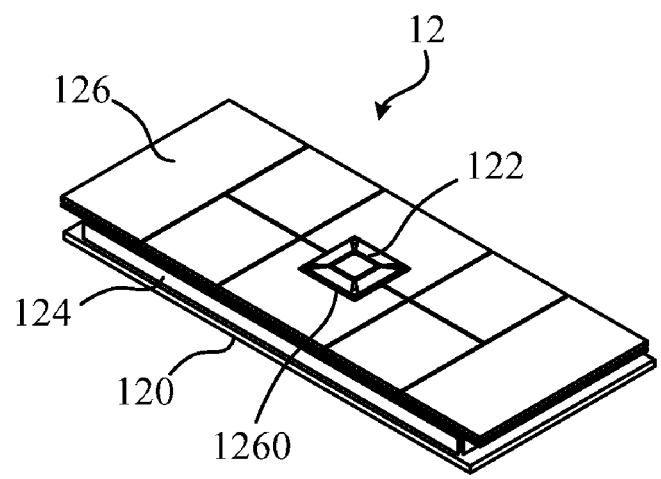
FIG. 2 is a schematic diagram illustrating the input device in FIG. 1.
Figure 3:
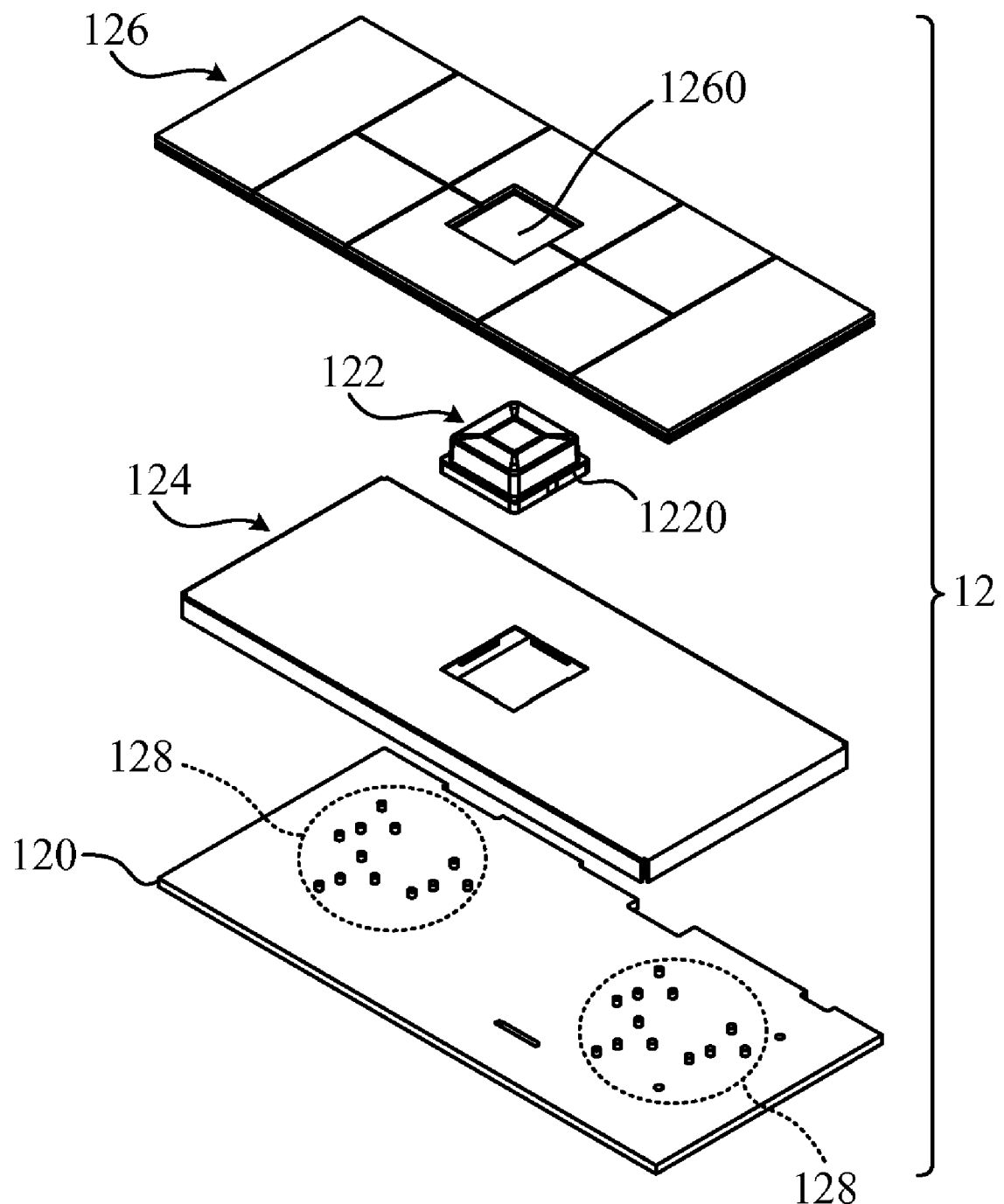
FIG. 3 is an exploded view illustrating the input device in FIG. 2.
Figure 4:
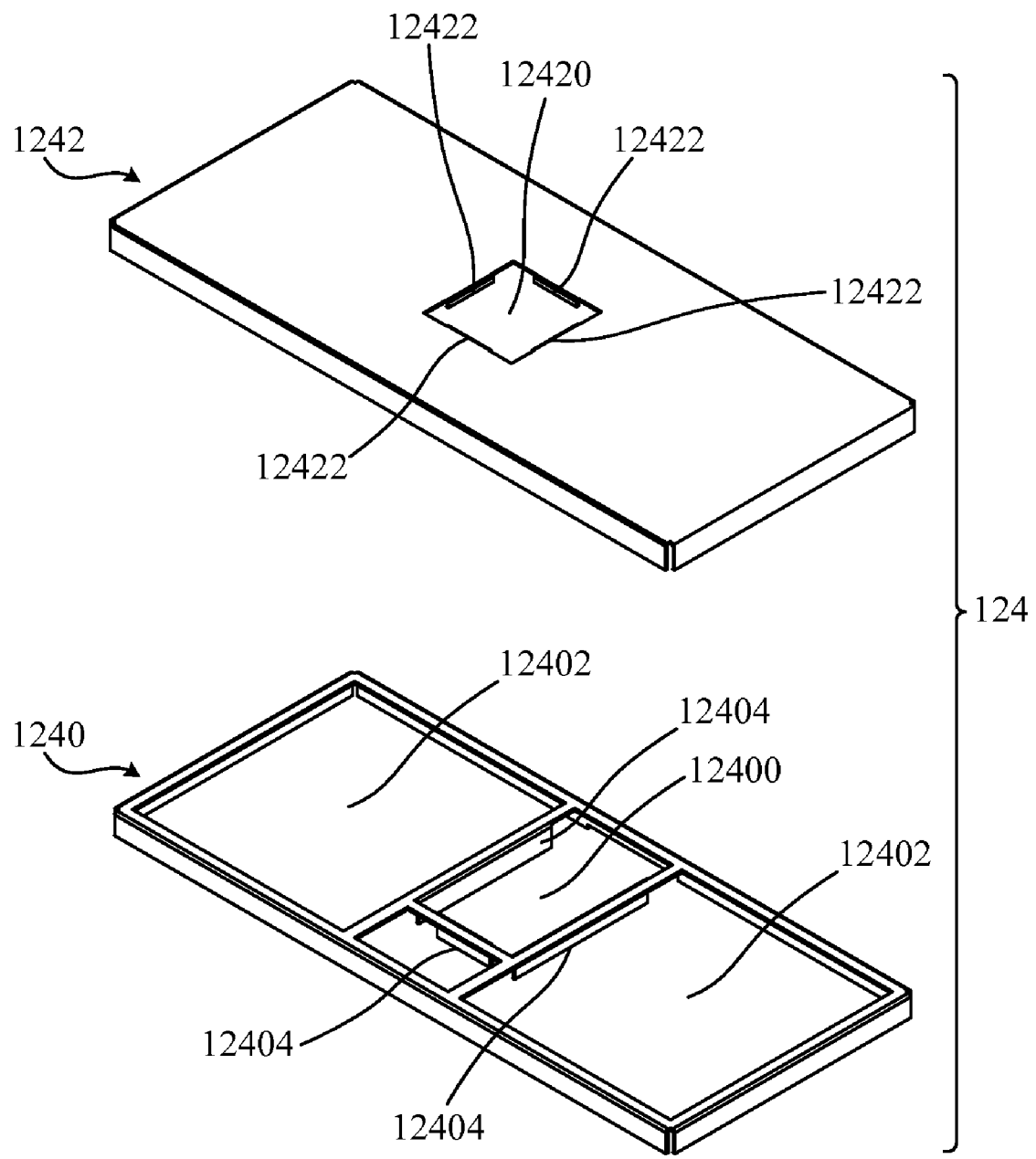
FIG. 4 is an exploded view illustrating the fixing module in FIG. 3.
Figure 5:
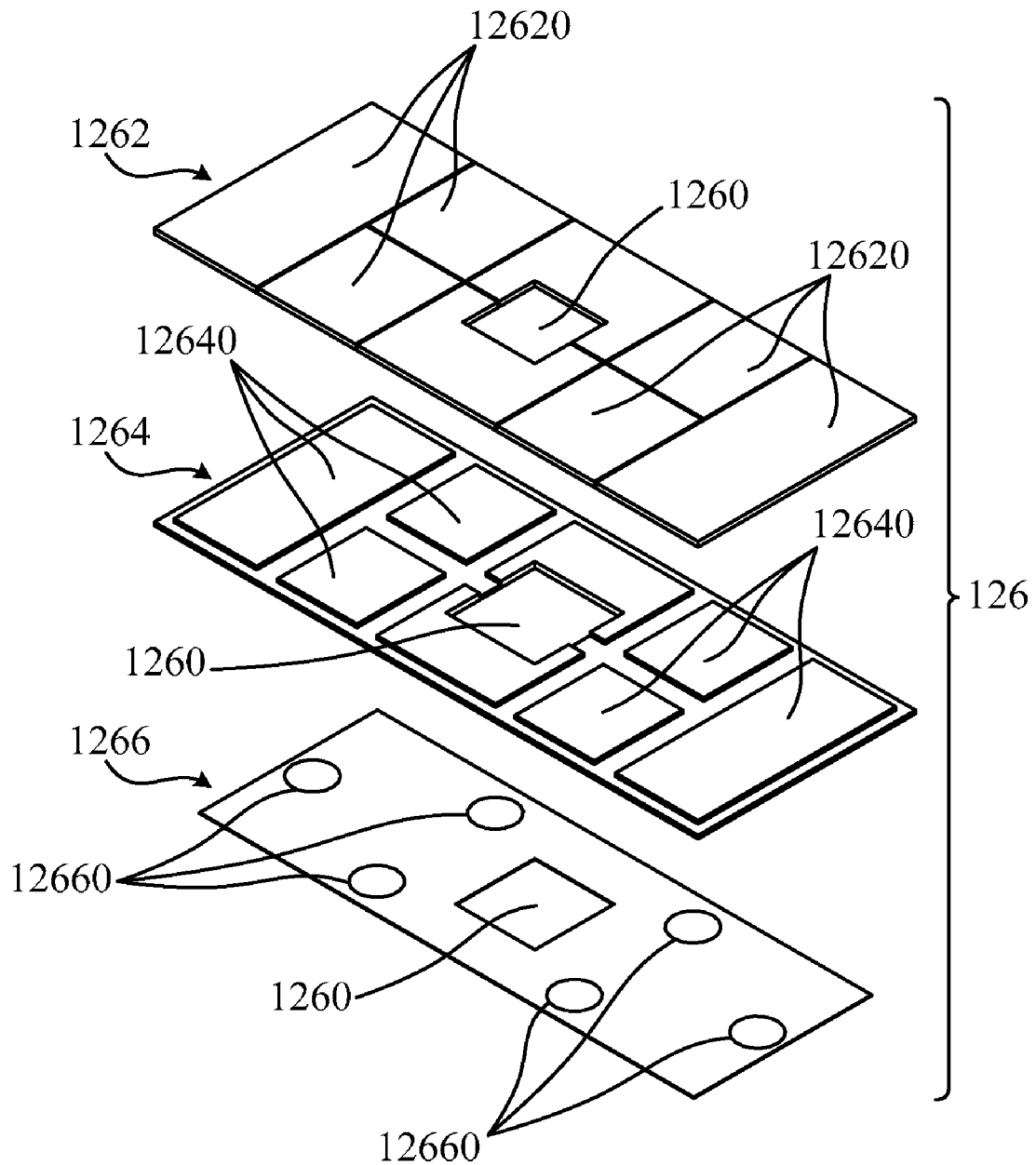
FIG. 5 is an exploded view illustrating the second input module in FIG. 3.

Please refer FIG. 2 to FIG. 5. FIG. 2 is a schematic diagram illustrating the input device 12 in FIG. 1. FIG. 3 is an exploded view illustrating the input device 12 in FIG. 2. FIG. 4 is an exploded view illustrating the fixing module 124 in FIG. 3. FIG. 5 is an exploded view illustrating the second input module 126 in FIG. 3.

As shown in FIG. 2 and FIG. 3, the input device 12 includes a circuit board 120, a first input module 122, a fixing module 124, and a second input module 126. In the embodiment, the first input module 122 can be an optical mouse, and the second input module 126 can be a keyboard module.

As shown in FIG. 3, the first input module 122 includes a first fixing portion 1220. Additionally, the electronic components 128 are disposed on the circuit board 120. For example, the electronic components 128 can be a resistor, an inductor, a capacitor, an IC (integration circuit), or a MOSFET.

As shown in FIG. 4, the fixing module 124 includes a first fixing member 1240 and a second fixing member 1242. The second fixing member 1242 can be engaged with the first fixing member 1240. The first fixing member 1240 includes a first accommodating space 12400, a second accommodating space 12402, and a plurality of stoppers 12404. The first accommodating space 12400 can be used to accommodate the first input module 122 in FIG. 3. In the embodiment, the two second accommodating space 12402 are located at, but not limited to, both sides of the first accommodating 12400 respectively. In other words, the number and the locations of the second accommodating spaces 12402 can be determined according to the practical application. Furthermore, the three stoppers 12404 are located around the first accommodating space 12400 respectively. When the first input module 122 is accommodated in the first accommodating space 12400, the first input module 122 can be located in the first accommodating space 12400 by the stoppers 12404.

The second fixing member 1242 includes a first opening 12420 and a plurality of second fixing portions 12422. The second fixing portions 12422 are located around the first opening 12420. When the first input module 122 is accommodated in the first accommodating space 12400, one end of the first input module 122 will protrude out of the first opening 12420, and the second fixing portions 12422 will be against the first fixing portion 1220 of the first input module 122 for fixing the first input module 122.

As shown in FIG. 2, FIG. 3, and FIG. 5, the second input module 126 includes a second opting 1260. After being assembled, one end of the first input module 122 is exposed from the second opening 1260 for users to operate. As shown in FIG. 5, the second input module 126 includes a keyboard body 1262, a resilient member 1264, and a flexible circuit board 1266. The flexible circuit board 1266 is disposed on the fixing module 124 in FIG. 3, the resilient member 1264 is disposed on the flexible circuit board 1266, and the keyboard body 1262 is disposed on the resilient member 1264. The second opening 1260 passes through the keyboard body 1262, the resilient member 1264, and flexible circuit board 1266.

In practical application, a plurality of keyswitches 12620 are disposed on the keyboard body 1262 for the users to press, to execute the functions the users want to input. Although only six keyswitches 12620 are shown in FIG. 5, but the number of the keyswitches 12620 is not limited to six. The resilient member 1264 has a plurality of resilience portions 12640, adapted to the keyboard body 1262, for supporting the keyswitches 12620 and providing the keyswitches 12620 elastic recovery forces after being pressed. The resilient member 1264 can be made of rubber or other elastic materials. Additionally, a plurality of metal domes 12660 are also on the flexible circuit board 1266. When one of the keyswitches 12620 is pressed, a corresponding metal dome 12660 will be triggered, to execute the functions the users want to input.

Figure 6:
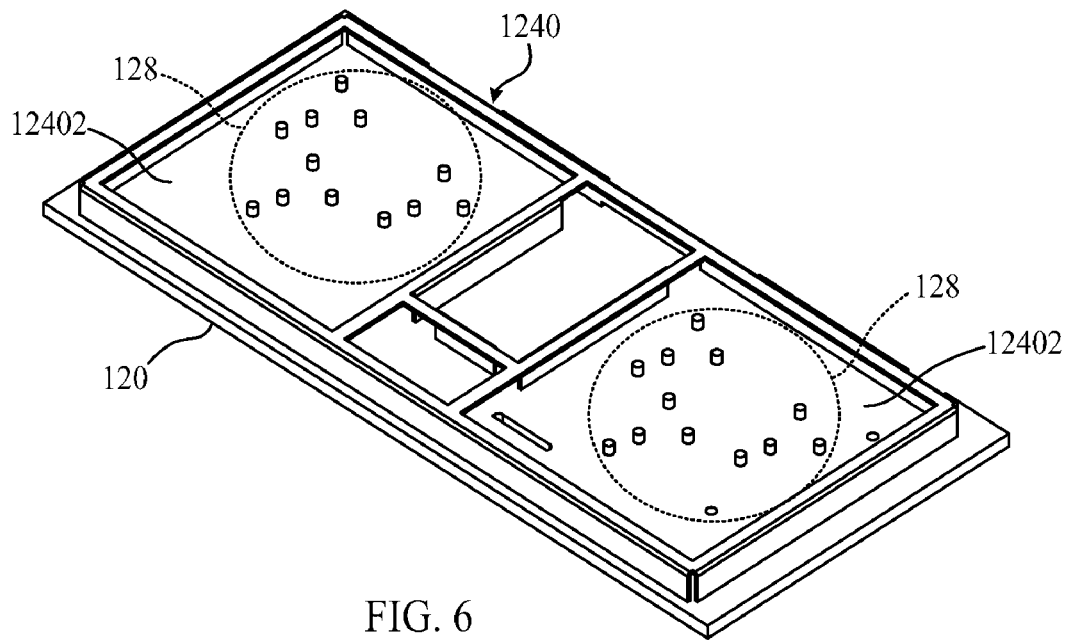
FIG. 6 is a schematic diagram illustrating that the first fixing member is assembled to the circuit board.
Figure 7:
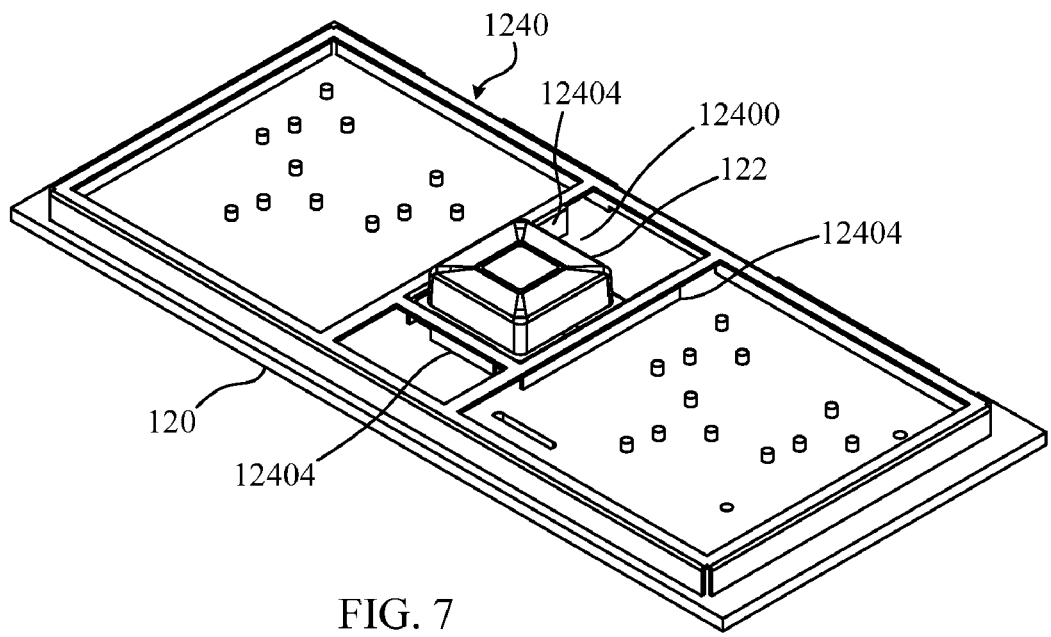
FIG. 7 is a schematic diagram illustrating that the first input module is assembled in the first accommodating space of the first fixing member.
Figure 8:
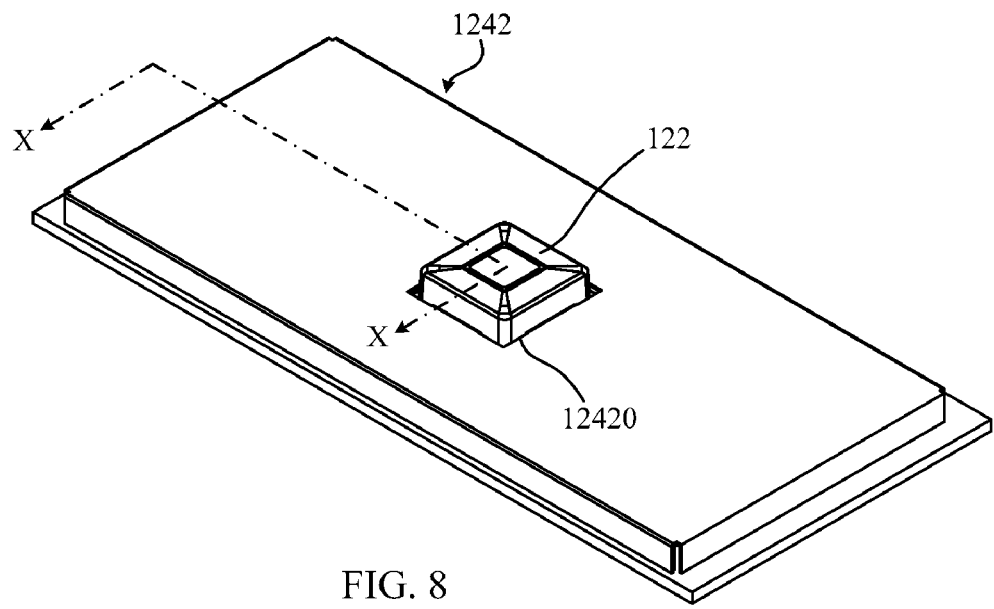
FIG. 8 is a schematic diagram illustrating that the second fixing member is assembled to the first fixing member.
Figure 9:
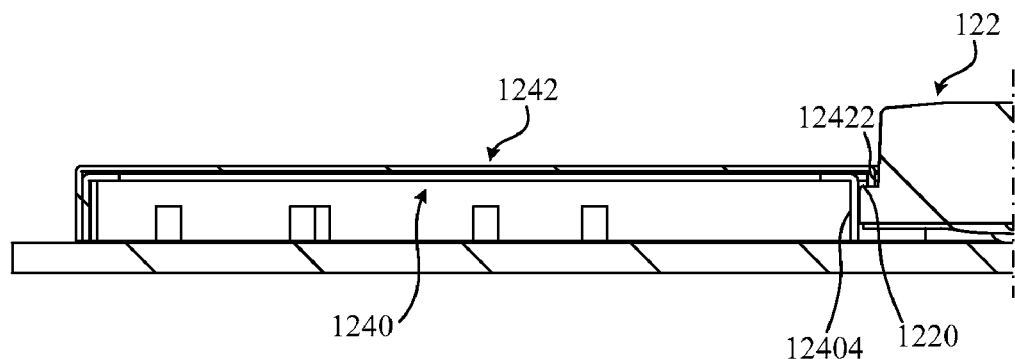
FIG. 9 is a cross-sectional view along line X-X of the FIG. 8.
Figure 10:
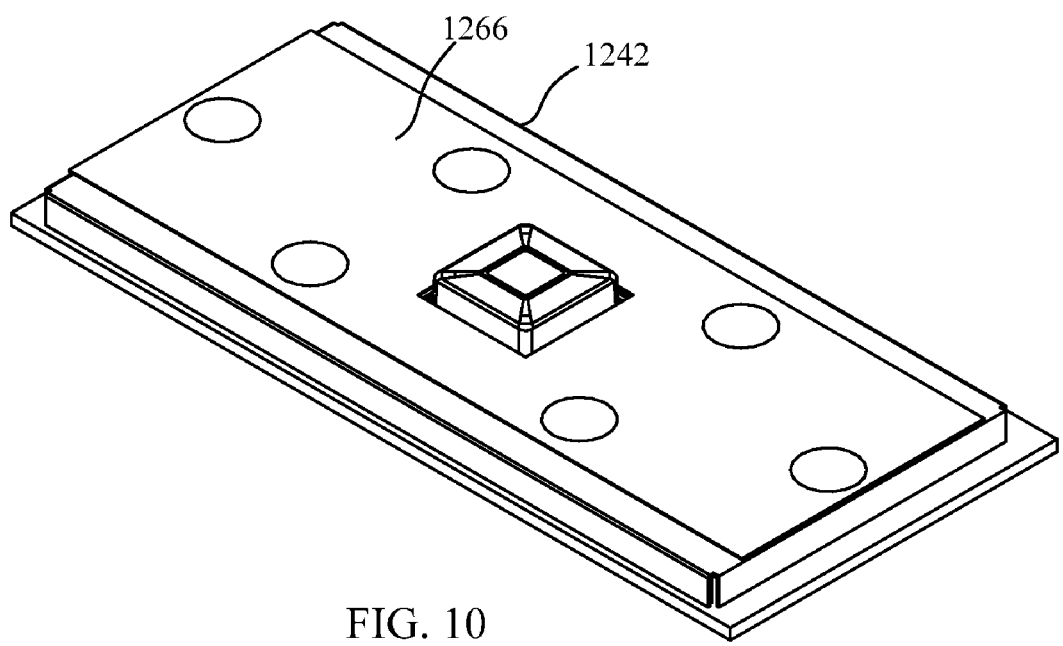
FIG. 10 is a schematic diagram illustrating that the flexible circuit board is assembled to the second fixing member.
Figure 11:
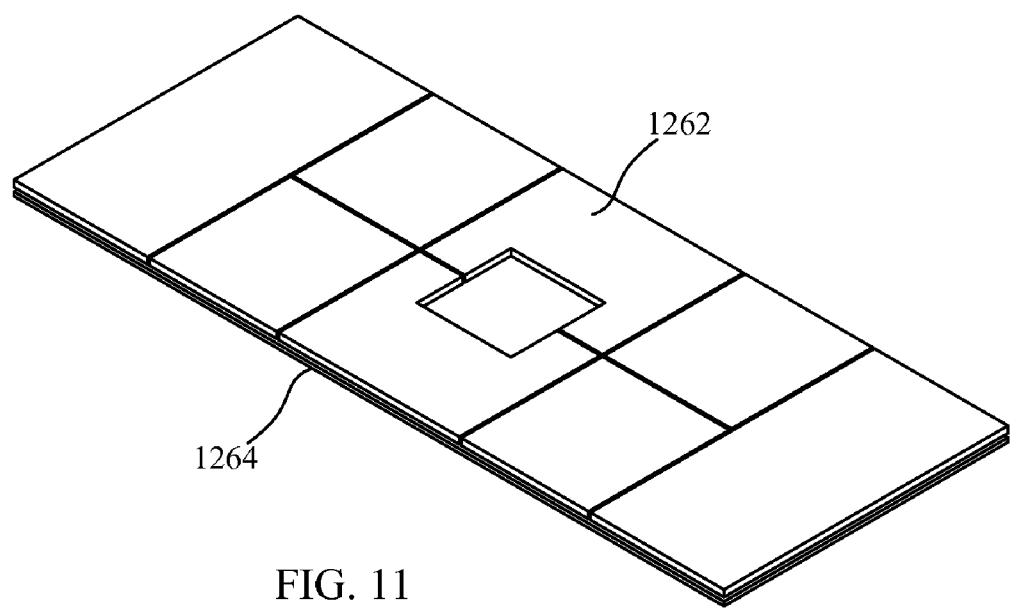
FIG. 11 is a schematic diagram illustrating that the keyswitch body is assembled to the resilient member.

Please refer to FIG. 6 to FIG. 11. FIG. 6 is a schematic diagram illustrating that the first fixing member 1240 is assembled to the circuit board 120. FIG. 7 is a schematic diagram illustrating that the first input module 122 is assembled in the first accommodating space 12400 of the first fixing member 1240. FIG. 8 is a schematic diagram illustrating that the second fixing member 1242 is assembled to the first fixing member 1240. FIG. 9 is a cross-sectional view along line X-X of the FIG. 8. FIG. 10 is a schematic diagram illustrating that the flexible circuit board 1266 is assembled to the second fixing member 1242. FIG. 11 is a schematic diagram illustrating that the keyswitch body 1262 is assembled to the resilient member 1264.

As shown in FIG. 6, the first fixing member 1240 can be firstly fixed on the circuit board 120 by applying well-known welding processes such as the SMT (Surface Mount Technology) processes or the DIP processes while assembling the input apparatus 12 in FIG. 2. Meanwhile, the electronic component 128 which is disposed on the circuit board 120 is located in the second accommodating space 12402 of the first fixing member 1240. In other words, because the first fixing member 1240 has the second accommodating space 12402, the layout area be on the circuit board 120 can be greatly increased, which is benefit to the miniaturization of electronic apparatuses.

As shown in FIG. 7, the first input module 122 is then disposed on the circuit board 120. At the same time, the first input module 122 is located in the first accommodating space 12400 of the first fixing member 1240. When the first input module 122 is accommodated in the first accommodating space 12400, the stoppers 12404 which are disposed around the first accommodating space 12400 will position the first input module 122 in the first accommodating space 12400.

As shown in FIG. 8, the second fixing member 1242 is then assembled on the first fixing member 1240 in FIG. 7. At the same time, one end of the first input module 122 can extend out of the first opening 12420 of the second fixing member 1242. In practical application, corresponding engagement portions can be disposed at the first fixing member 1240 and the second fixing member 1242 respectively, so that the second fixing member 1242 and the first fixing member 1240 can be engaged to each other.

As shown in FIG. 9, the input module 122 is positioned by the stoppers 12404 of the first fixing member 1240, and the second fixing portion 12422 of the second fixing member 1242 is against the first fixing portion 1220 of the first input module 122 for fixing the first input module 122.

As shown in FIG. 10, the flexible circuit board 1266 is disposed on the second fixing member 1242.

The keyswitch body 1262 and the resilient member 1264 are assembled to each other, as shown in FIG. 11.

Finally, the keyswitch body 1262 and the resilient member 1264 in FIG. 11 are assembled on the flexible circuit board 1266 in FIG. 10 to achieve the input apparatus 12 in FIG. 2.

Compared with prior arts, the invention positions and fixes the input module (e.g., an optical mouse) by using a fixing module and disposes an accommodating space which can accommodates electronic components on in the fixing module to greatly increase the layout area on the circuit board. Thereby, the electronic apparatus can be minimized to be more attractive to consumers.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as being limited only by the metes and bounds of the appended claims.

What is claimed is:

1. An input device, comprising:
  a circuit board;
  a first input module, disposed on the circuit board, the first input module comprising a first fixing portion;
  a fixing module comprising a first opening, a first accommodating space, and a plurality of second fixing portions, the fixing module being disposed on the circuit board, the first input module being disposed in the first accommodating space, the second fixing portions being disposed around the first opening and against the first fixing portion; and a second input module, disposed on the fixing module, the second input module comprising a second opening, the first input module being exposed from the second opening.

2. The input device of claim 1, wherein the first input module is an optical mouse.

3. The input device of claim 1, further comprising a plurality of electronic components, the fixing module further comprising a second accommodating space, those electronic components being disposed on the circuit board and accommodated in the second accommodation space.

4. The input device of claim 1, wherein the fixing module comprises:
 a first fixing member, disposed on the circuit board, the first fixing member comprising the first accommodating space; and
 a second fixing member, engaged with the first fixing member, the second fixing member comprising the first opening and the second fixing portions.

5. The input device of claim 4, wherein the first fixing member further comprises a plurality of stoppers, the stoppers are disposed around the first accommodation space.

6. The input device of claim 1, wherein the second input module is a keyboard module.

7. The input device of claim 1, wherein the second input module comprises:
 a flexible circuit board being disposed on the fixing module;
 a resilient member being disposed on the flexible circuit board; and
 a keyboard body being disposed on the resilient member;
 wherein the second opening passes through the keyboard body, the resilient member, and the flexible circuit board.

8. An electronic apparatus, comprising:
 a housing; and
 an input device, disposed on the housing, the input device comprising:
 a circuit board;
 a first input module, disposed on the circuit board, the first input module comprising a first fixing portion;
 a fixing module comprising a first opening, a first accommodating space, and a plurality of second fixing portions, the fixing module being disposed on the circuit board, the first input module being disposed in the first accommodating space, the second fixing portions being disposed around the first opening and against the first fixing portion; and
 a second input module, disposed on the fixing module, the second input module comprising a second opening, the first input module being exposed from the second opening.

9. The electronic apparatus of claim 8, wherein the first input module is an optical mouse.

10. The electronic apparatus of claim 8, further comprising a plurality of electronic components, the fixing module further comprising a second accommodating space, the electronic components being disposed on the circuit board and accommodated in the second accommodation space.

11. The electronic apparatus of claim 8, wherein the fixing module comprises:
 a first fixing member, disposed on the circuit board, the first fixing member comprising the first accommodating space; and
 a second fixing member, engaged with the first fixing member, the second fixing member comprising the first opening and the second fixing portions.

12. The electronic apparatus of claim 11, wherein the first fixing member further comprises a plurality of stoppers, the stoppers are disposed around the first accommodation space.

13. The electronic apparatus of claim 8, wherein the second input module is a keyboard module.

14. The electronic apparatus of claim 8, wherein the second input module comprises:
 a flexible circuit board being disposed on the fixing module;
 a resilient member being disposed on the flexible circuit board; and
 a keyboard body being disposed on the resilient member;
 wherein the second opening passes through the keyboard body, the resilient member, and the flexible circuit board.

* * * * *